United States Patent
Knutson et al.

(10) Patent No.: US 8,737,553 B2
(45) Date of Patent: May 27, 2014

(54) SYNC DETECTION AND FREQUENCY RECOVERY FOR SATELLITE SYSTEMS

(75) Inventors: Paul Gothard Knutson, Lawrenceville, NJ (US); Dirk Schmitt, Villingen (DE); Wen Gao, West Windsor, NJ (US)

(73) Assignee: Thomson Licensing, Issy Moulineaux (FR)

( * ) Notice: Subject to any disclaimer, the term of this patent is extended or adjusted under 35 U.S.C. 154(b) by 0 days.

(21) Appl. No.: 13/322,167

(22) PCT Filed: May 28, 2010

(86) PCT No.: PCT/US2010/001572
§ 371 (c)(1),
(2), (4) Date: Nov. 23, 2011

(87) PCT Pub. No.: WO2010/138201
PCT Pub. Date: Dec. 2, 2010

(65) Prior Publication Data
US 2012/0069942 A1    Mar. 22, 2012

Related U.S. Application Data

(60) Provisional application No. 61/217,333, filed on May 29, 2009.

(51) Int. Cl.
| | | |
|---|---|---|
| *H04L 7/08* | (2006.01) | |
| *H04L 7/04* | (2006.01) | |
| *H04L 27/26* | (2006.01) | |
| *H04W 56/00* | (2009.01) | |
| *H04H 40/90* | (2008.01) | |

(52) U.S. Cl.
CPC ........ *H04L 27/2678* (2013.01); *H04L 27/2679* (2013.01); *H04L 27/2656* (2013.01); *H04L 27/2613* (2013.01); *H04L 7/042* (2013.01); *H04W 56/005* (2013.01); *H04H 40/90* (2013.01)
USPC ........... 375/366; 375/365; 375/362; 375/354; 375/343; 375/340; 375/316

(58) Field of Classification Search
CPC ............ H04L 27/2656; H04L 27/2668; H04L 27/2673; H04L 27/2675; H04L 27/2676; H04L 27/2678; H04L 27/2679; H04L 27/2655; H04L 27/2613; H04L 27/2662; H04L 7/041; H04W 56/005; H04H 40/90
USPC .......... 370/470, 342; 375/359, 362, 343, 150, 375/344, 340, 316, 366, 365, 354
See application file for complete search history.

(56) References Cited

U.S. PATENT DOCUMENTS

| | | | |
|---|---|---|---|
| 4,649,543 A | | 3/1987 | Levine |
| 5,675,581 A | * | 10/1997 | Soliman ........................ 370/252 |

(Continued)

FOREIGN PATENT DOCUMENTS

| | | |
|---|---|---|
| EP | 2150003 A1 | 3/2010 |
| WO | 2008136375 A1 | 11/2008 |

OTHER PUBLICATIONS

Kassam, S.A., "Nonparametric Hard Limiting and Sign Detection of Narrow-Band Deterministic and Random Signals," Oceanic Engineering, IEEE Journal of, vol. 12, No. 1, pp. 66, 74, Jan. 1987.*

(Continued)

*Primary Examiner* — Chieh M Fan
*Assistant Examiner* — Michelle M Koeth
(74) *Attorney, Agent, or Firm* — Robert D. Shedd; Jeffrey M. Navon

(57) ABSTRACT

A method of frame sync detection is described. A first and second differential correlation of a data stream is calculated, at a plurality of delay and conjugate multipliers. The first and second differential correlations are convolved with a previous set of differential correlations. A correlation peak is calculated, at a sync detector, using the convolved differential correlations, to detect a frame sync.

9 Claims, 14 Drawing Sheets

(56) References Cited

U.S. PATENT DOCUMENTS

| | | | |
|---|---|---|---|
| 2008/0043886 A1 | 2/2008 | Inagawa et al. | |
| 2009/0052562 A1* | 2/2009 | Akahori | 375/260 |
| 2010/0135335 A1* | 6/2010 | Matsumoto et al. | 370/503 |
| 2011/0131464 A1* | 6/2011 | Ko et al. | 714/752 |
| 2012/0134432 A1* | 5/2012 | Popovic | 375/260 |

OTHER PUBLICATIONS

"Digital Video Broadcasting (DVB) User Guidelines for the Second Generation System for Broadcasting, Interaactive Services, News Gathering and Other Broadband Satellite Applicatioins (DVB-S2); ETSI TR 102 376", ETSI Standards, vol. BC, No. V1.1.1, Cedex, France, Feb. 1, 2005, pp. 76-78.*

Roman Kuc, Introduction to Digital Signal Processing, 2008 reprint of 1982 book, BS Publications, p. 32.*

Lee et al., "Robust Frame Synchronization for Low Signal-to-Noise Ratio Channels Using Energy-Corrected Differential Correlation," EURASIP Journal on Wireless Communications and Networking, vol. 2009, Feb. 2009.*

"Digital Video Broadcasting (DVB) User Guidelines for the Second Generation System for Broadcasting, Interaactive Services, News Gathering and Other Broadband Satellite Applicatioins (DVB-S2); ETSI TR 102 376", ETSI Standards, vol. BC, No. V1.1.1, Cedex, France, Feb. 1, 2005, pp. 69-72.

Hawkes et al, "Constructioin and Performance of a PCM Frame Synchronizer with Self-Varying Threshold", IEEE Transactions on Communication Technology, vol. COM-16, No. 1, New York, Feb. 1, 1968, pp. 142-148.

Lande et al., "Running Cross-Correlation Using Bitstream Processing", Electronics Letters, vol. 43, No. 2, GB, Oct. 25, 2007, pp. 1181-1183.

Sharif et al., "The Application of Cross Correlation Techninque for Estimating Impulse Response and Frequency Response of Wireless Communication Channel", Research and Development, 2007, Scored 2007, 5th Studey Conference, Dec. 12, 2007, pp. 1-5.

Lee et al., "Robust Frame Synchronization for Low Signal-to-Noise Ratio Channels Using Energy-Corrected Differential Correlation", EURASIP Journal on Wireless Communications and Networking, vol. 2009 (2009), Article ID 345989, 2009, 8 pages.

Yang Jianxiao et al: "Physical Layer Design for DVB-S2 CCM Mode" Intelligent Signal Processing and Communications, 2006. ISPACS '0 6, International Symposium on, IEEE, PI, Dec. 1, 2006, pp. 1017-1020.

* cited by examiner

SYNC DETECTION AND FREQUENCY RECOVERY FOR SATELLITE SYSTEMS

CROSS-REFERENCE TO RELATED APPLICATIONS

This application claims the benefit, under 35 U.S.C. §365 of International Application PCT/US2010/001572, filed May 28, 2010, which was published in accordance with PCT Article 21(2) on Dec. 2, 2010 in English and which claims the benefit of U.S. provisional patent application No. 61/217,333 filed May 29, 2009.

TECHNICAL FIELD

The present principles relate to a method and apparatus for improved frame sync detection and frequency recovery for satellite systems.

BACKGROUND OF THE INVENTION

Traditional frame sync detection only uses 1 T differential correlation. This concept is explained in Appendix C.3.1 of ETSI TR 102 376 V1.1.1, the DVB-S2 specification discussing the usage of 1 T differential correlation for frame sync detection.

Additionally, examples of frequently used feed-forward carrier recovery schemes using commonly known receiver designs and implementations are shown in Heinrich Meyr, et al., "Digital communication receivers: synchronization, channel estimation and signal processing."

U.S. Pat. Nos. 5,878,088 and 5,943,369 describe known symbol timing recovery methods that are improved upon by present principles through the frequency estimation schemes provided herein.

SUMMARY OF THE INVENTION

These and other drawbacks and disadvantages of the prior art are addressed by the present principles, which are directed to a method and apparatus for improved frame sync detection and frequency recovery for satellite systems.

According to an aspect of the present principles, there is provided a method and apparatus for improved frame sync detection and frequency recovery for satellite systems.

A method of frame sync detection and an apparatus performing frame sync detection is described. A first and second differential correlation of a data stream is calculated, at a plurality of delay and conjugate multipliers. The first and second differential correlations are convolved with a previous set of differential correlations. A correlation peak is calculated, at a sync detector, using the convolved differential correlations, to detect a frame sync.

A MASK block masks out data from the convolved differential correlations, if a blind mode is used. The products of the convolved differential equations are computed at a sign correlator. The products of the convolved differential equations are summed at an adder. The absolute value of the convolved differential equations is generated at an absolute value block. A magnitude of correlation of the convolved differential equations is computed at a magnitude block. The first differential correlation may be a 1 T differential correlation and the second differential correlation may be a 2 T differential correlation.

A slew rate limiter calculates an adaptive threshold. The correlation peak may be calculated using the convolved differential equations and the adaptive threshold.

A method of data aided frequency estimation and an apparatus that performs data aided frequency estimation is described. A plurality of frames is received, at a storage field, including a plurality of sync signals having the same sync pattern in each frame transmitted at known intervals. A differential correlation of the plurality of frames is calculated, at a sum function block and an arg function block. The differential correlation may be calculated using the equation:

$$\Omega' T_s = \arg\left\{\sum_k \sum_L [z_{n+1,k} z_{n,k}^*][z_{n+1,k+1} z_{n,k+1}^*]\right\},$$

wherein $\Omega'$ represents the frequency estimate, $T_s$ represents the symbol rate, k represents an index indicating the current sync field, L represents the length of the sync field, and z represents the received signal plus noise.

A method of non data aided maximum likelihood frequency estimation and an apparatus that performs non data aided maximum likelihood frequency estimation is described. A plurality of frames is received, at a storage field, including a plurality of sync signals. A maximum likelihood is computed, at an Mth power block, on the plurality of frames. An autocorrelation function is performed, at an autocorrelation block, to exchange a phase step increment measurement with the Mth power block. A differential correlation is computed, at a sum function block and an arg function block. The differential correlation uses equations:

$$\Omega' T_s = \arg\left\{\sum_L y_{n+1} y_n^*\right\} \text{ and } y(l) = \frac{1}{N}\sum_n z(n)^M z(n-l)^M,$$

where N>L.

A method of frequency estimation correction and an apparatus for frequency estimation correction performed by a feedback frequency recovery loop circuit is described. Derotation is performed on the sync symbols and data symbols within a received data signal. The data signal is processed at a matched filter. Frequency estimation is performed, at a frequency estimator, based on the processed data signal received from the matched filter. The frequency estimates are smoothed at a loop filter. A numerically controlled oscillator feeds the output back to a derotator. The data signal may be resampled at a symbol timing recovery block, to enable timing recovery of the sync symbols and data symbols.

A method of frequency estimation correction and an apparatus for frequency estimation correction in a feedforward frequency recovery loop circuit is described. A data signal is resampled, at a symbol timing recovery block, to enable timing recovery of sync symbols and data symbols. A matched filter processes the data signal. A frequency estimator, performs frequency estimation based on the processed data signal received from the matched filter. A numerically controlled oscillator, feeds the output to a derotator.

These and other aspects, features and advantages of the present principles will become apparent from the following detailed description of exemplary embodiments, which is to be read in connection with the accompanying drawings.

DETAILED DESCRIPTION OF THE INVENTION

Figure 1:
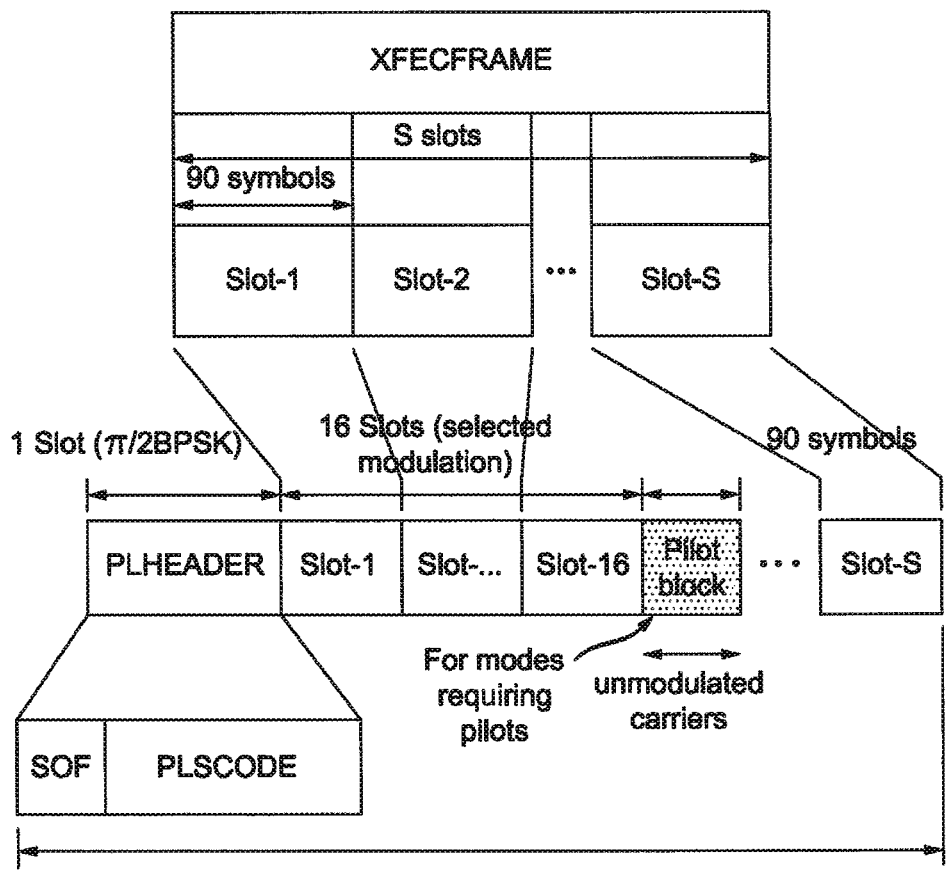
FIG. 1 shows an exemplary prior art diagram of a DVBS2 frame structure showing PLHEADER and Pilot blocks.

Features and aspects of described implementations may be adapted for other implementations. Although implementations described herein may be described in a particular context, such descriptions should in no way be taken as limiting the features and concepts to such implementations or contexts.

The implementations described herein may be implemented in, for example, a method or process, an apparatus, or a software program. Even if only discussed in the context of a single form of implementation (for example, discussed only as a method), the implementation or features discussed may also be implemented in other forms (for example, an apparatus or program). An apparatus may be implemented in, for example, appropriate hardware, software, and firmware. The methods may be implemented in, for example, an apparatus such as, for example, a computer or other processing device. Additionally, the methods may be implemented by instructions being performed by a processing device or other apparatus, and such instructions may be stored on a computer readable medium such as, for example, a CD, or other computer readable storage device, or an integrated circuit. Further, a computer readable medium may store the data values produced by an implementation.

As should be evident to one of skill in the art, implementations may also produce a signal formatted to carry information that may be, for example, stored or transmitted. The information may include, for example, instructions for performing a method, or data produced by one of the described implementations. The signal may take a variety of forms, including for example, the signal may be analog, digital, and the signal may be baseband or modulating a carrier frequency suitable for transmission. Further, the signal may be recorded on computer readable medium.

Additionally, many implementations may be implemented in one or more of an encoder, a pre-processor to an encoder, a decoder, or a post-processor to a decoder. The implementations described or contemplated may be used in a variety of different applications and products. Some examples of applications or products include set-top boxes, cell phones, personal digital assistants (PDAs), televisions, personal recording devices (for example, PVRs, computers running recording software, VHS recording devices), camcorders, streaming of data over the Internet or other communication links, and video-on-demand.

Further, other implementations are contemplated by this disclosure. For example, additional implementations may be created by combining, deleting, modifying, or supplementing various features of the disclosed implementations.

An approach for improving frame sync detection by adding 2 T differential correlation to 1 T differential correlation is described herein. Using both 1 T differential correlation and 2 T spaced differential correlation provides improved correlation responses at low SNR (signal to noise ratio). This approach adds 2 T differential correlation to a traditional DVB-S2 frame sync detection algorithm.

A combination of 1 T and 2 T differential correlation allows a system to lock at 1 db SNR with 5% excess bandwidth. This enables operation of a satellite system with greater capacity per channel compared with the DVB-S2 standard, while keeping hardware requirements at a minimum.

As channel capacity is increased, excess bandwidth usage occurs. This excess bandwidth must be reduced. Existing algorithms do not provide a way to increase channel capacity while also reducing excess bandwidth usage. The present arrangement provides an algorithm that uses a second orthogonal correlation in parallel with a first orthogonal correlation. This is in contrast to direct correlation of header and pilot signals which are sensitive to carrier offset and not useful for keeping a low SNR and low excess bandwidth usage.

Two levels of differential correlation are used in order to find the frame sync within a system at SNR threshold of 1.5 dB. While increasing the delay in the differential correlation increases the sensitivity to carrier offsets, this is not a problem for the range of offsets expected in a satellite receiver. Using a 1 T and 2 T differential correlation in combination correlates a differentiated reference signal with a differentiated received signal. This results in a reduction of the effect of carrier offsets on correlation. Carrier offsets are defined as the rotation of the signal caused by differences in the transmitted carrier frequency and the frequency of the chain of oscillators which bring the received signal down to baseband.

Changing the number of symbols between differential references produces an additional orthogonal signal, which, when correlated with similar differentiated received signals, provides a means of increasing the likelihood of detecting the reference signal in the received sequence. Specifically, a signal is generated based on the conjugate product of delayed input signals. 1 T differential correlation uses the conjugate product of the signal and the signal delayed by one symbol. 2 T differential correlation uses the conjugate product of the signal and the signal delayed by two symbols. 3 T and longer differential correlations further improve frame sync detection and may also be implemented in the present arrangement.

The 1 T and 2 T differential correlation as described above may be represented by:

$$dref_1(n) = ref(n)ref^*(n+1) \quad n \in 0 \ldots N-2$$

$$dref_2(n) = ref(n)ref^*(n+2) \quad n \in 0 \ldots N-3 \quad (1)$$

where N is the length of the reference sequence, ref(n), $dref_m(n)$ are the differential correlation references.

At a receiver, for processing purposes, the signals are received and represented by:

$$dy_1(n) = y(n)y^*(n+1)$$

$$dy_2(n) = y(n)y^*(n+2) \quad (2)$$

where y(n) is a received signal, with a reference signal ref(n) embedded within the signal.

The signals $dy_1$ and $dy_2$ are computed and convolved with the time reversed $dref_1$ and $dref_2$ signals. The results of these correlations are added together, and the correlation peak indicates the presence of the desired reference signal to be used for frame sync recovery.

A slew rate limited adaptive threshold may also be used to assist in frame sync correlation and is described further in the paragraphs below.

In a satellite system, the reference signal, as shown in FIG. 1, is located in the PLHEADER and pilot block fields. The PLHEADER field is divided into the SOF block and PLSCODE block. The SOF and optional pilot blocks are always known, the PLSCODE block is typically known in broadcast scenarios. The PLHEADER is coded to allow blind detection, enabling correlation to 32 of the 64 symbols in the PLSCODE block. The SOF block includes 26 symbols, the PLSCODE block includes 64 symbols, and the optional pilot blocks contain 36 symbols. Some or all of these may be used as the ref signal in this arrangement. FIG. 1 shows an exemplary diagram of a DVB-S2 frame structure showing PLHEADER and Pilot blocks.

Figure 2:
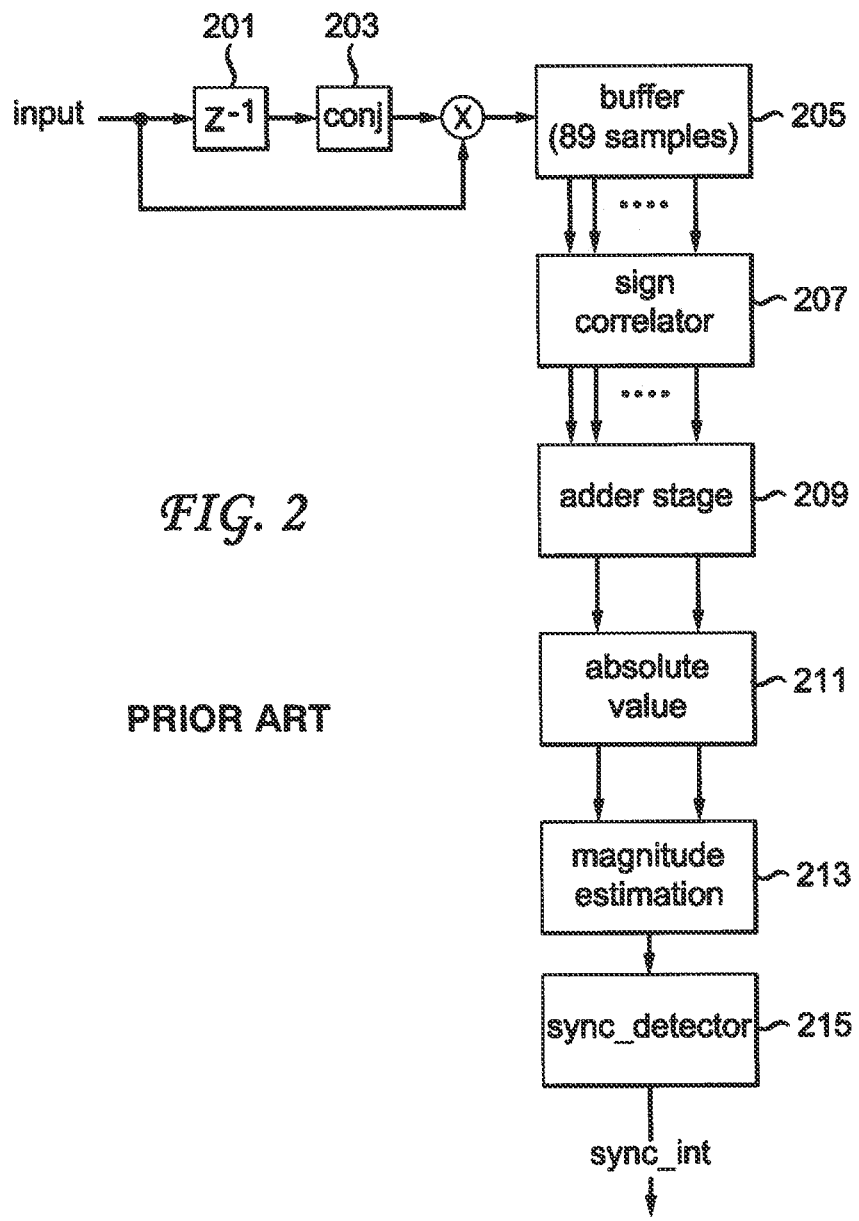
FIG. 2 shows a prior art DVB-S2 Differential Correlation Hardware Implementation used for Frame Synchronization.

FIG. 2 shows a prior art DVB-S2 differential correlation used for frame synchronization. One differential correlation is calculated by delay multiplier 201 and conjugate multiplier 203. Buffer 205 is a shift register that stores past samples for correlation. Sign correlator 207 computes the product of the stored differential correlation and the differential correlation calculated by delay multiplier 201 and conjugate multiplier 203. Adder stage 209 represents a tree of adders that sum up the correlation products. Absolute value block 211 generates an absolute value of the correlation products. Magnitude estimation block 213 computes the magnitude of the correlation. Sync detector 215 discovers a correlation peak and matches the discovery of a correlation peak to produce a reference signal matching the timing of the satellite system.

Figure 3:
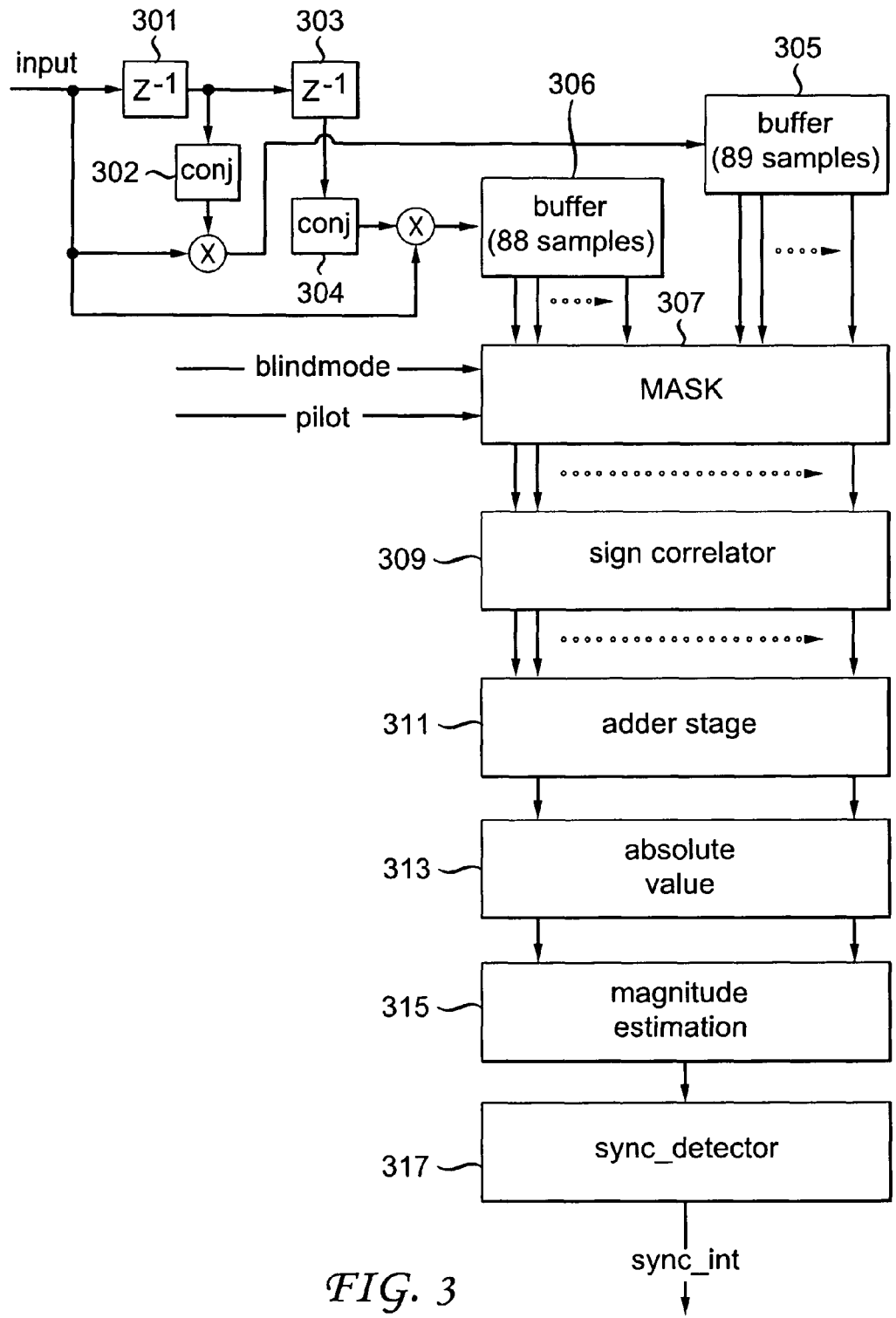
FIG. 3 shows an improved differential correlation hardware implementation used for frame synchronization according to present principles.

FIG. 3 shows an improved differential correlation system using both 1 T and 2 T differential correlation. Delay and conjugate multipliers 301 and 302, and 303 and 304, respectively, calculate both $dy_1$ and $dy_2$. Buffers 305 and 306 receive $dy_1$ and $dy_2$, respectively, and function as a shift register to store past samples for correlation. MASK 307 is used to mask out data that is not used in a blind mode. MASK 307 is not found in conventional systems such as that shown in FIG. 2.

In a blind mode, the PLSCODE block may be unknown, and only the SOF and possible pilot fields are available for differential correlation. Alternatively, in blind mode, half the PLSCODE data may be considered known with a 1 T differential correlation since the PLSCODE is encoded such that every other sample is either the same or the inverse of the previous sample. The 2 T differential correlation cannot be used on the PLSCODE in blind mode, however, when PLSCODE and SOF are both known, a total of 89 bits is used in 1 T differential correlation, and 88 bits are used in 2 T differential correlation. In blind mode, 25+32 bits are used in 1T differential correlation and 24 bits are used in 2 T differential correlation. If pilot signals are available, an additional 35 1 T differential correlation and 34 2 T differential correlations can be added. The pilot signal correlations are separated in time from the header correlations and reuse the correlation hardware. In most broadcast applications, the PLSCODE will be known, as a specific modulation format and code rate, i.e. data rate, will be used. Blind mode is needed when it is possible to receive signals where the modulation or code rate is not known, and needs to be discovered. Even in blind mode, there may be limits on the constellation and forward error control code rates that are used.

Sign correlator 309 computes the products of $dref_n$ and $dy_n$. Only the sign bit of the reference signal, $dref_n$ is required, and implemented by controlling multiplexers of $dy_n$ and $-dy_n$. A sign correlator provides hardware for performing correlation, where the reference, a signal of +/−1, is used to select positive or negative versions of the other multiplicant. Adder stage 311 represents a tree of adders that sums up the correlation products. Absolute value block 313 computes an absolute value of the correlation products. Magnitude estimation block 315 computes the magnitude of the correlation represented by Alpha*max(|I|, |Q|)+Beta*min(|I|, |Q|), where alpha and beta are constants chosen to minimize error over the range of operation, and minimize hardware complexity. Sync detector 317 matches the discovery of a correlation peak to find a reference signal to match the timing of the satellite system.

Frame synchronization may further be improved by using an adaptive threshold for identifying frame synchronization correlations. Traditionally, a fixed threshold is used. The paragraphs below describe an adaptive threshold for frame synchronization in digital communications that have known physical layer header information and/or pilot information.

The output of the improved frame sync correlation system described above and shown in FIG. 3 is normally processed by a leaky, slew rate limited peak hold buffer. When an input exceeds a peak hold buffer value by more than the slew rate condition, the frame sync strobe is identified. A frame sync strobe represents a pulse indicating the start of a data frame.

Slew rate limits the rate of change of a signal. In this implementation, the rate of increase is limited, and when an input signal exceeds the slew rate, it is determined that a correlation peak is found. The leakage keeps an adaptive threshold for the frame sync correlator, allowing the peak hold to droop, enabling the next peak detection.

Figure 4:
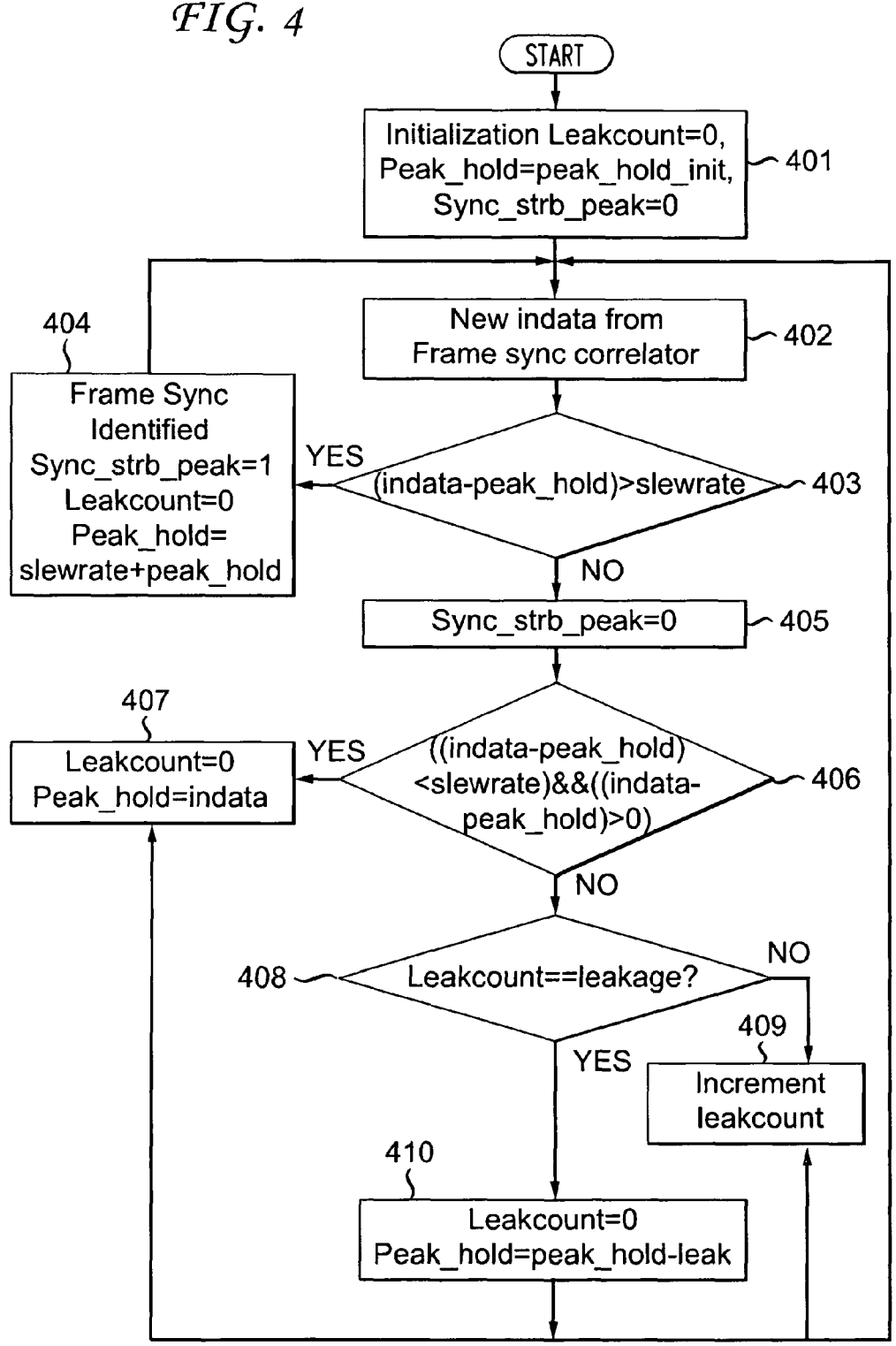
FIG. 4 is a flowchart showing an algorithm used for frame sync detection with a slew rate limiter.

FIG. 4 illustrates a flowchart for an algorithm for an adaptive threshold slew rate sync detector. The definitions of the variables provided in the algorithm are enumerated below:
1) leakcount—A counter which controls leakage of the peak_hold register. When the count is completed, the peak_hold register is reduced by leak.
2) leak—the amount by which the peak_hold register is reduced when the leakcount counter overflows.
3) peak_hold—The register which holds the slew rate adapted threshold for the sync detector.
4) leakage—The maximum count of the leak counter, leakcount, at which the peak_hold register is reduced by leak.
5) peak_hold_init—Initial value for the peak_hold register.
6) sync_strb_peak—Register indicating sync correlation peak.
7) Slewrate—maximum change allowed by entry to peak_hold register.

FIG. 4 shows an algorithm used for frame sync detection with a slew rate limiter. At step 401, the algorithm is initialized, so that leakcount=0, peak_hold=peak_hold_init, and sync_strb_peak=0. At step 402, new indata is received from a frame sync correlator and represents the output correlation. At step 403, it is determined if (indata−peak_hold)>slewrate. If yes, then the algorithm proceeds to step 404, where a frame sync is identified, and sync_strb_peak=1, leakcount=0, and peak_hold=slewrate+peak_hold. The correlation peaks vary in amplitude significantly in practice, a massive peak would take too long to leak off. Thus, including a slew rate limiter is advantageous. If the determination in step 403 is no, then the algorithm proceeds to step 405, where sync_strb_peak is set to 0. At step 406, it is determined if ((indata−peak_hold)<slewrate)&&((indata−peak_hold)>0). If yes, then the algorithm proceeds to step 407, where leakcount=0 and peak_hold=indata. If no, then the algorithm proceeds to step 408, where it is determined if leakcount==leakage. If these variables are not equal, then leakcount is incremented at step 409. If these variables are equal, then the algorithm proceeds to step 410 where leakcount=0 and peak_hold is set equal to peak_hold-leak.

Figure 5:
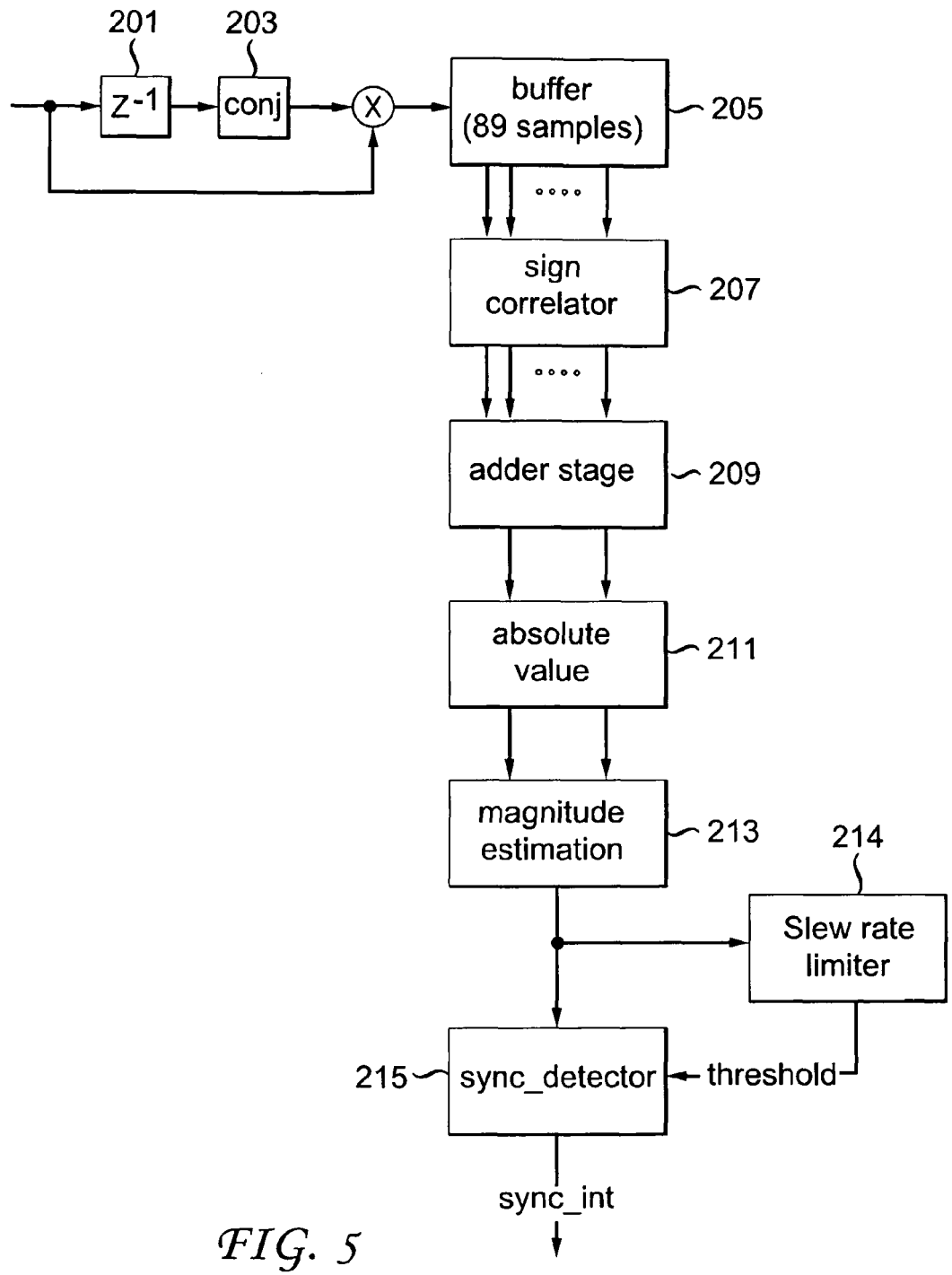
FIG. 5 shows a hardware implementation of differential correlation hardware using a slew rate limiter for adding an adaptive threshold.

FIG. 5 shows a slew rate limiter added to the frame synchronization system shown in FIG. 2. All components are the same as described above with respect to FIG. 2, except for the addition of slew rate limiter 214 which provides the adaptive threshold for sync detector 215. Slew rate limiter 214 may also be implemented within the improved differential correlation system shown in FIG. 3.

Frequency recovery schemes are also provided herein which are used to estimate the frequency offset in a single carrier. The following paragraphs shall discuss an improved NDA-ML (Non-Data Aided Maximum Likelihood) frequency recovery algorithm, and a blind DA (Data Aided) frequency recovery algorithm for systems with known sync and pilot signals, such as those used in the DVB-S2 standard. Data aided algorithms are blind in the sense that only the location of the sync and pilot signals are needed, and not the actual data content from a signal stream. This is useful when sync data contains information that is repeatedly transmitted, but not known in advance.

The present arrangement provides carrier synchronization for satellite systems, and in particular, for systems using synchronization and pilot symbols similar to DVB-S2, and digital communication systems in general. Addition of a frequency estimator according to present principles enables faster acquisition of channels while keeping a receiver locked at a low operating SNR.

A DA frequency recovery algorithm is normally performed in a non-blind mode where sync signals must be known a priori. The blind DA frequency recovery algorithm according to present principles does not need to know sync signals a priori and only needs the location of the syncs, and not the sync pattern itself.

Figure 6:
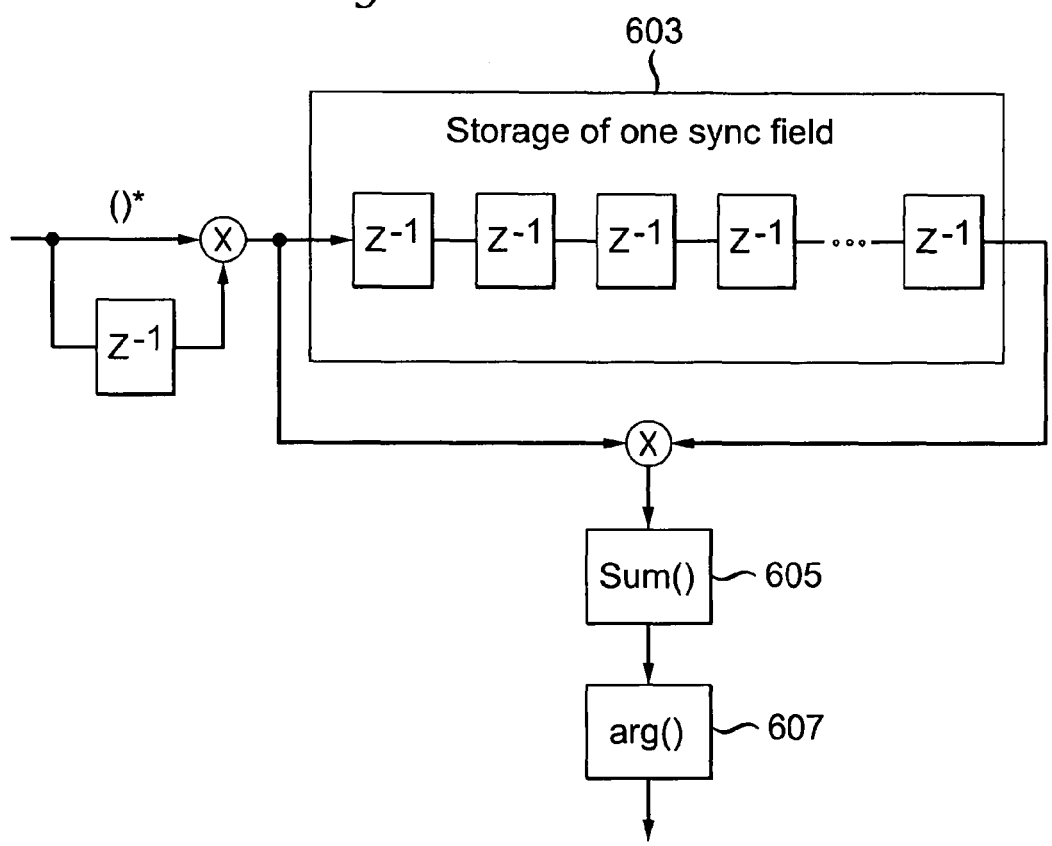
FIG. 6 shows a hardware implementation for a data aided frequency estimator.

The DA approach to frequency recovery depends on the repetition of sync signals that have the same sync pattern in every frame. FIG. 6 shows a hardware implementation of the data aided frequency recovery algorithm. The carrier is determined by correlating the sync signals of two or more consecutive frames stored in storage field 603. The equation used for correlation performed by sum function block 605 and arg function block 607 may be represented by:

$$\Omega' T_s = \arg\left\{\sum_k \sum_L [z_{n+1,k} z_{n,k}^*][z_{n+1,k+1} z_{n,k+1}^*]\right\} \quad (3)$$

where $\Omega'$ denotes the frequency estimate, $T_s$ denotes the symbol rate, k denotes an index indicating the current sync field, L denotes the length of the sync field, and z denotes the received signal plus noise.

Compared to a traditional Mth power approach, the DA frequency recovery algorithm calculates the correlation as $$\Omega' T_s = \arg\left\{\sum_L [z_{n+1} z_n^*]^M\right\} \quad (4)$$

where M represents the order of symmetry in a constellation (i.e. 4 for QPSK or QAM, 2 for BPSK), and the traditional training based approach represented by $$\Omega' T_s = \arg\left\{\sum_L [z_{n+1} z_n^*][a_n a_{n+1}^*]\right\} \quad (5)$$

where $a_n$ denotes an a priori known training signal. The new algorithm represented by Equation 3 above, is less sensitive to AWGN, since it is not correlated between sync fields, and does not need to know the training signals. Instead, the new algorithm only needs to know when sync fields occur within a training signal.

Figure 7:
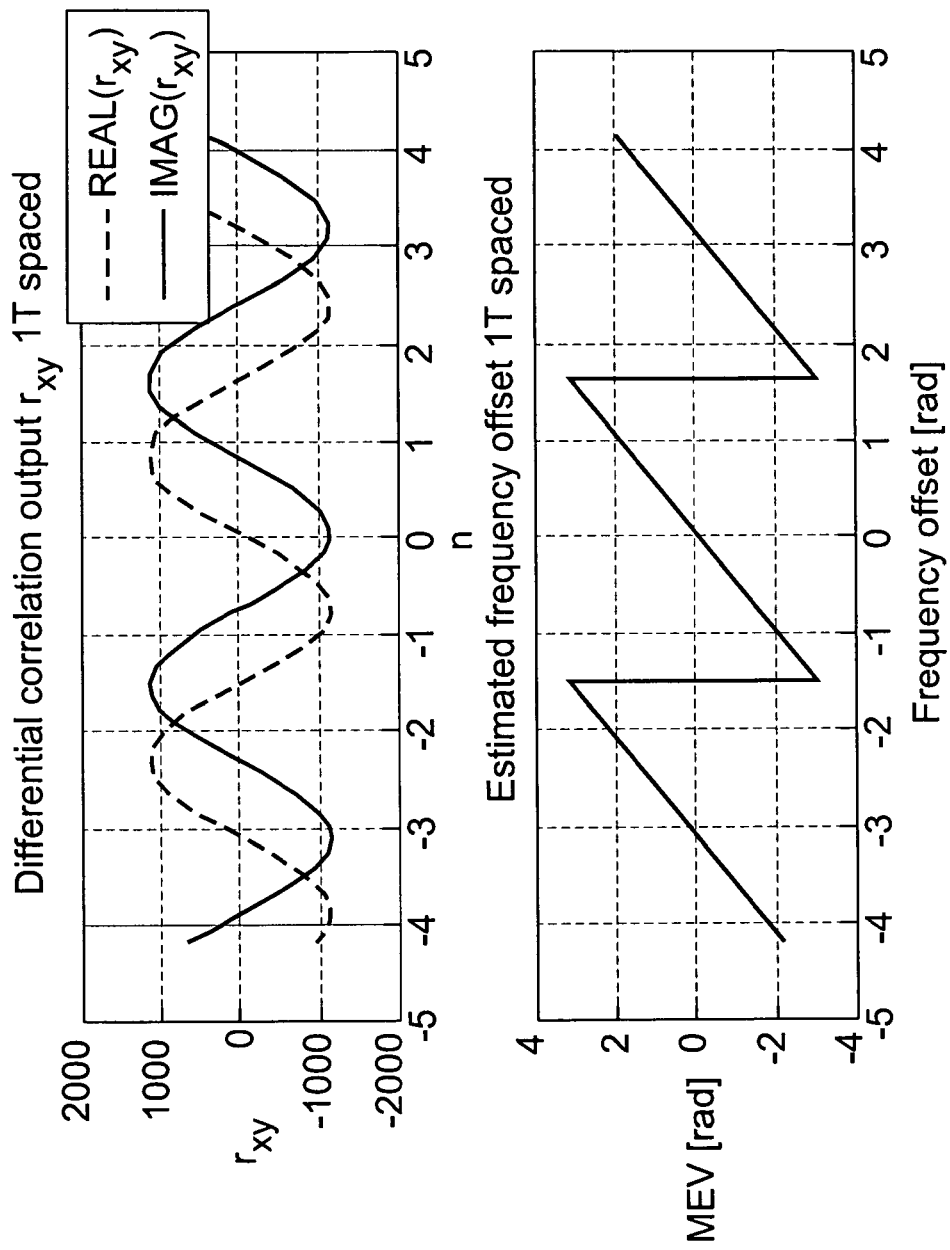
FIG. 7 shows a differential correlation output plot and a corresponding estimated frequency offset plot when using data aided frequency estimation.

FIG. 7 shows the response of the estimator based on the differential correlation by showing both the differential correlation output, estimated frequency offset, and frequency offset. The estimator operates over a full range of +/−1/(2 $T_s$). This particular range is limited by band limiting parts of the system, such as a pulse shaping filter or any roofing filters in a receiver chain. In addition, the range is sensitive to changes in frequency offset due to the large delay between syncs. For example, in DVB-S2 QPSK, the delay is 32,490 symbols. Changes in frequency offset over k periods of estimation would need to be less than +/−1/(32490 $T_s$).

This may not be a design issue for certain satellite receiver designs, since even though the range of possible frequency offsets are large, they are caused by a dielectric resonator oscillator (DRO) used as a local oscillator (LO) in an outdoor low noise block (LNB) converter unit. This unit is relatively stable, and drifts only with temperature. In summary, the frequency offsets in satellite systems can be large, but do not change quickly—the oscillators in the signal chain are all quite stable, enabling the use of an algorithm with a long measurement period.

Figure 8:
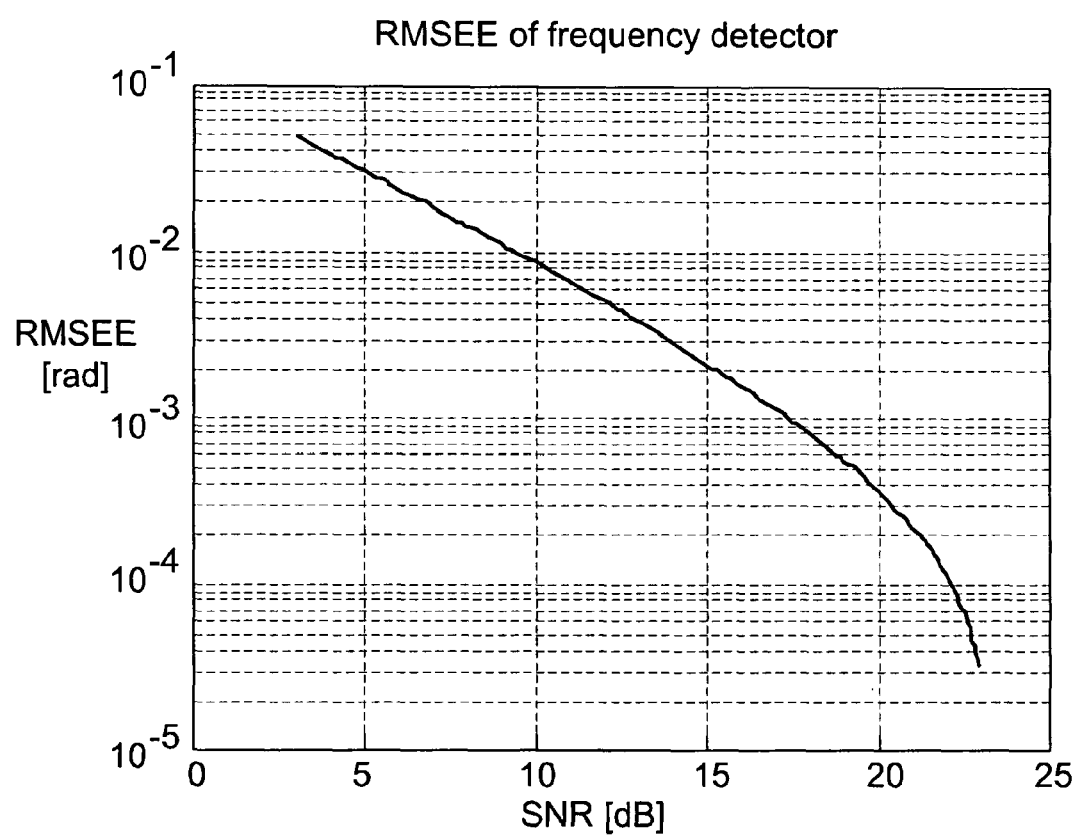
FIG. 8 shows a plot of Root Mean Square Estimation Error (RMSEE) vs. SNR when using data aided frequency estimation.

FIG. 8 shows the root mean square estimation error (RMSEE) vs. SNR. For low SNR applications, an iterative approach or further averaging is required to further reduce the variance of the frequency detector. Due to the broad range of acquisition in the aforementioned algorithm, it is suited for use with a coarse frequency recovery system. This particular recovery system may also be augmented with a fine frequency recovery loop.

NDA frequency recovery is normally performed without additional autocorrelation and may be used to address issues encountered in the data-aided approach described above. The improved NDA-ML frequency recovery algorithm improves frequency estimates using a second stage that is based on autocorrelation. This results in an improvement over a traditional maximum likelihood approach, especially for higher order modulations.

Figure 9:
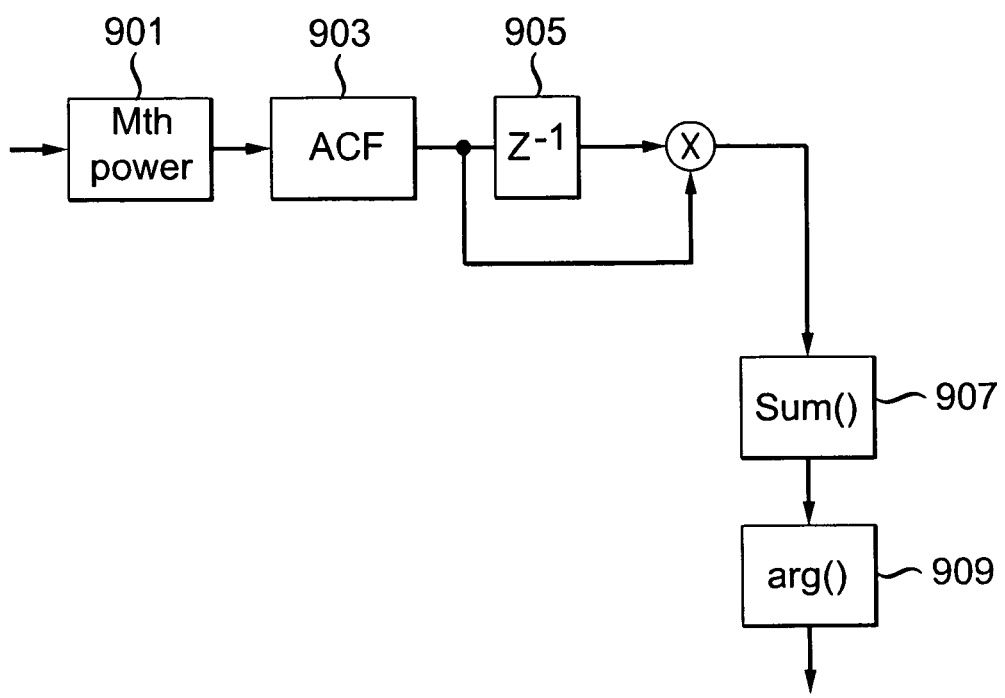
FIG. 9 shows a hardware implementation of a non data-aided frequency recovery algorithm according to present principles.

FIG. 9 shows a hardware implementation of the improved NDA-ML frequency recovery algorithm. The traditional Mth power algorithm, also known as the maximum likelihood (ML) algorithm, is represented by the following equation:

$$\Omega' T_s = \arg\left\{\sum_L [z_{n+1} z_n^*]^M\right\} \quad (6)$$

The autocorrelation (ACF) and phase step increment measurement are exchanged in equation 8, at blocks 901 and 903. The correlation is performed at sum block 907 and arg block 909 and represented by $$\Omega' T_s = \arg\left\{\sum_L y_{n+1} y_n^*\right\} \quad (7)$$

$$y(l) = \frac{1}{N} \sum_n z(n)^M z(n-l)^M \quad (8)$$

where N>L.

The choice of N and L depend on different design parameters which are dependent on specific system characteristics. To handle large frequency deviations, L and N must be small enough to track the deviation. If the detector needs to operate reliably at a low SNR, the L and N interval should be very large in order to reduce the variance of the estimation. The improved NDA-ML algorithm described above as well as the hardware implementation shown in FIG. 9 may be used in either feedforward or feedback configurations.

Figure 10:
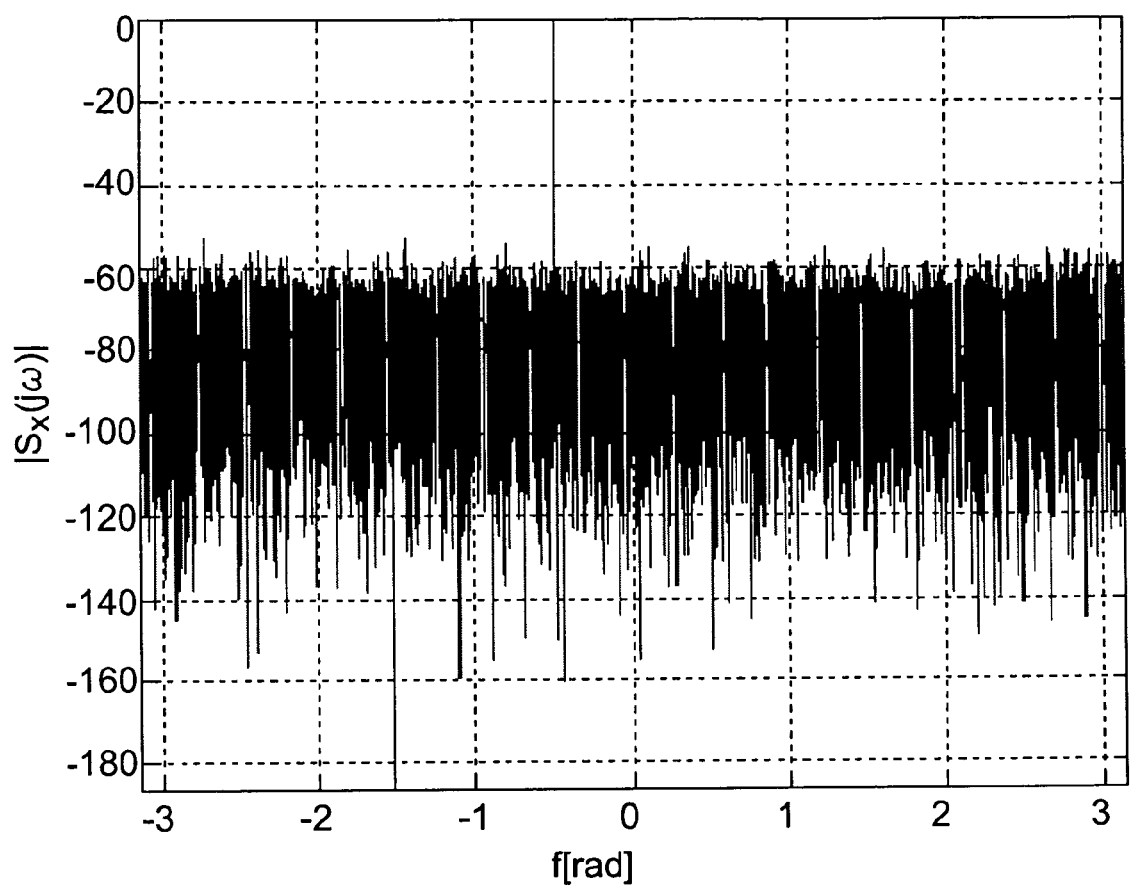
FIG. 10 shows a performance plot of a traditional ML frequency recovery algorithm.

FIG. 10 shows the spectrum of a traditional ML approach to frequency recovery. This example uses 32APSK modulation at 10 dB SNT. The factor M is set to 16 for a 32APSK constellation, limiting the frequency offset estimator range to [$-\pi/16; \pi/16$]. In the plot shown in FIG. 10, the carrier tone is $\pi/4$, which indicates a frequency offset of about 1/64 the symbol rate. The tone peak is about 60 dB above the noise floor.

Figure 11:
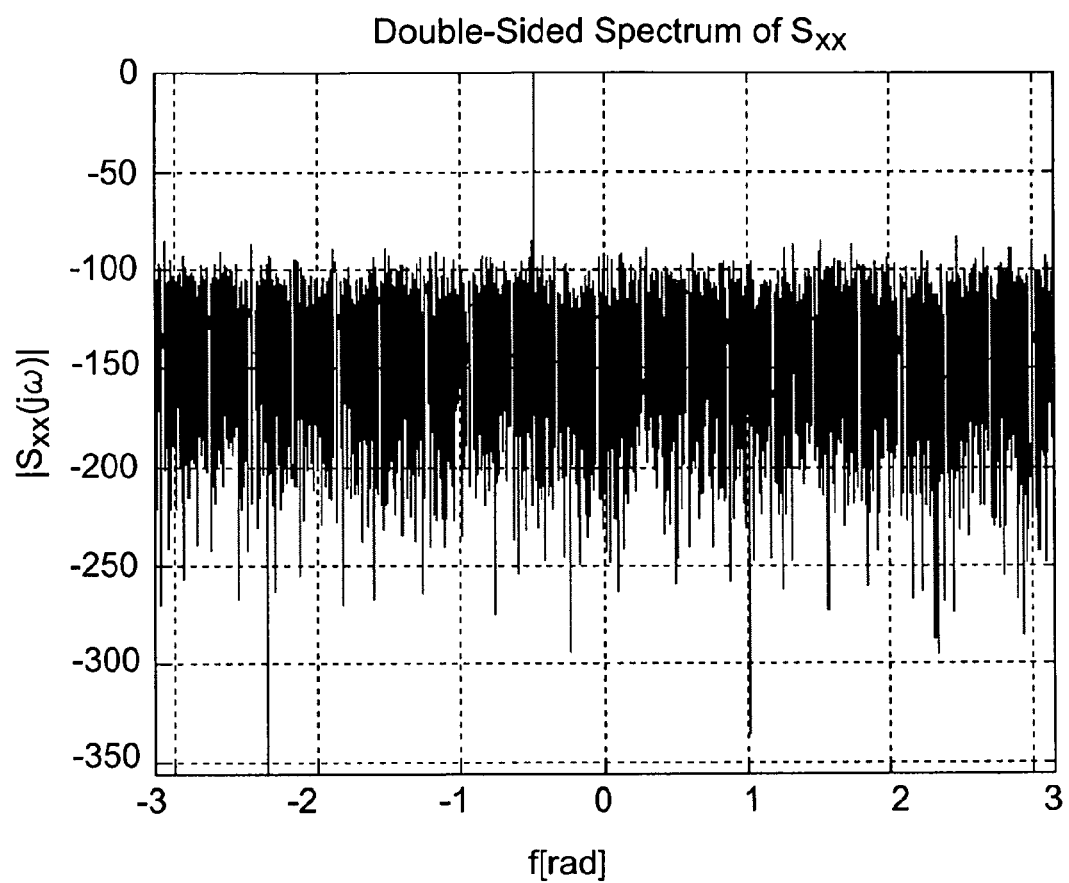
FIG. 11 shows a performance plot of a modified ML frequency recovery algorithm according to present principles.

FIG. 11 shows the spectrum using the improved NDA-ML frequency recovery algorithm described in the paragraphs above. The tone peak is approximately 100 db above the noise floor. Thus, it is evident that the improved NDA-ML algorithm outperforms a traditional ML approach. The tone is identified with less noise. The purity of the tone will improve receiver performance since there is less phase noise caused by the carrier recovery frequency estimate.

Figure 12:
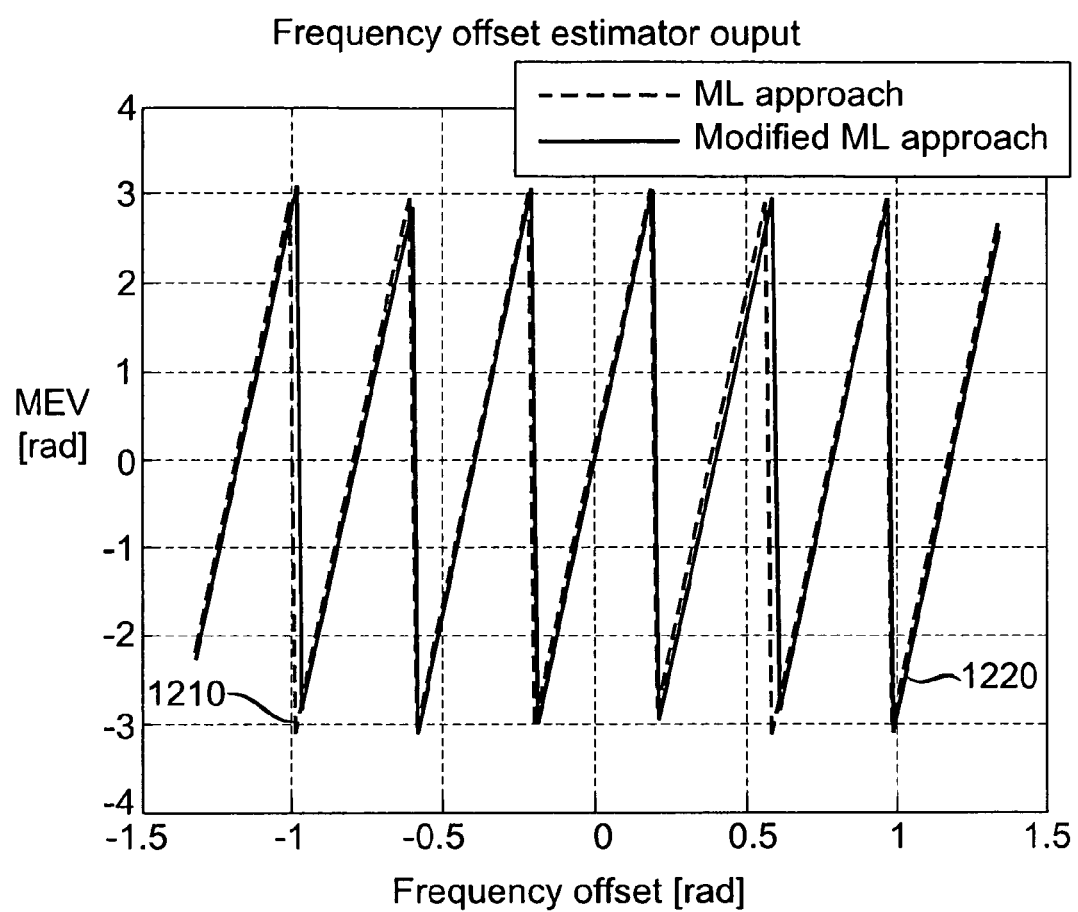
FIG. 12 shows a comparison of the frequency offset estimator output when using the traditional ML approach and the modified ML approach.

FIG. 12 shows a comparison of mean estimation error using a traditional ML frequency estimator with the improved NDA-ML frequency estimator. The traditional ML frequency estimator output is represented by ML approach line 1210 and the improved NDA-ML frequency estimator output is represented by Modified ML approach line 1220. In this particular example, the SNR is 10 dB, and N=4096, using 32APSK modulation. The $\pi/8$ periodicity in the estimator output is the result of the M exponent of the estimator algorithm, which limits the estimator range to [$-\pi/16/\pi/16$]. This estimator matches the frequency offset to mean error value (MEV) of the traditional ML frequency estimator.

Figure 13:
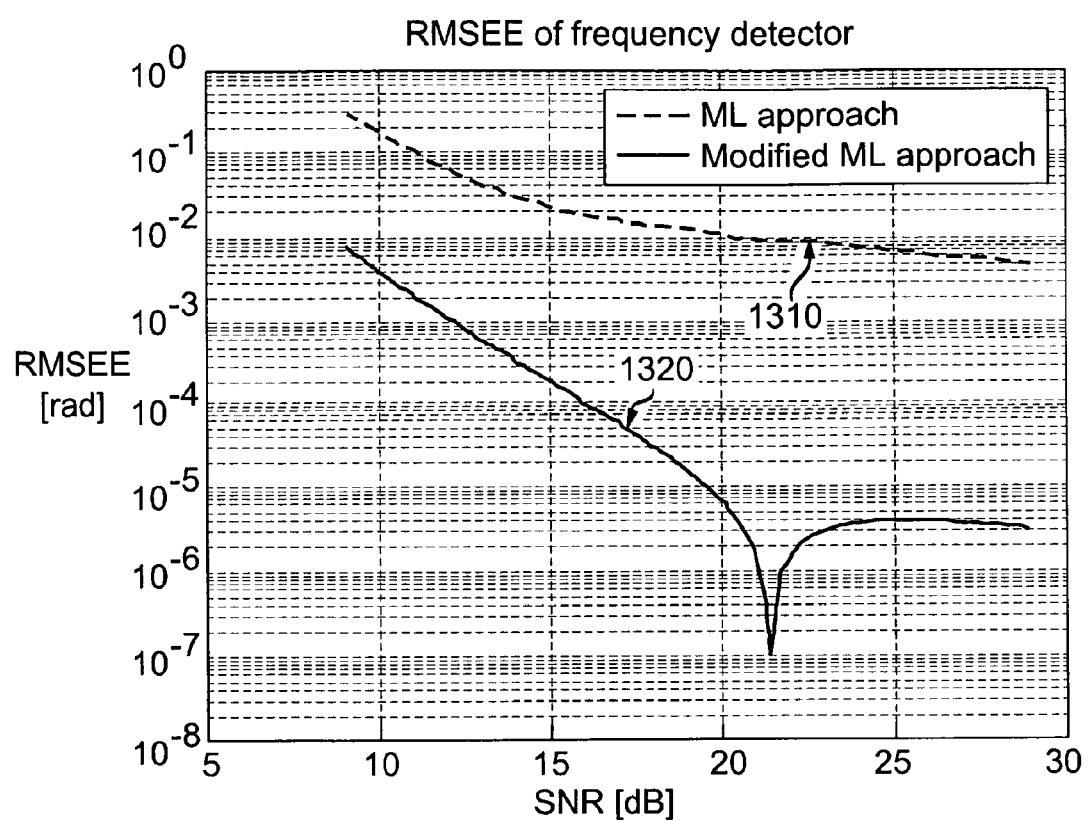
FIG. 13 is a graph showing the mean square estimation error for the NDA-ML algorithm according to present principles.

FIG. 13 shows a comparison of the improved modified NDA-ML algorithm compared to a traditional ML algorithm. The traditional ML frequency estimator output is represented by ML approach line 1310 and the improved NDA-ML frequency estimator output is represented by Modified ML approach line 1320. The diagram shows that the improved modified NDA-ML algorithm described in the paragraphs above has a much lower estimation variance in this particular 32APSK example over the operating range of 12.5 dB to 16 dB. Compared to the traditional ML frequency estimator, the improved NDA-ML algorithm enables use of 32APSK in the low SNR operating range by providing a robust, low noise carrier frequency offset measurement. Phase noise is a significant problem in higher order constellations, and this algorithm provides significant performance benefits in minimizing phase noise from the carrier recovery system.

Figure 14:
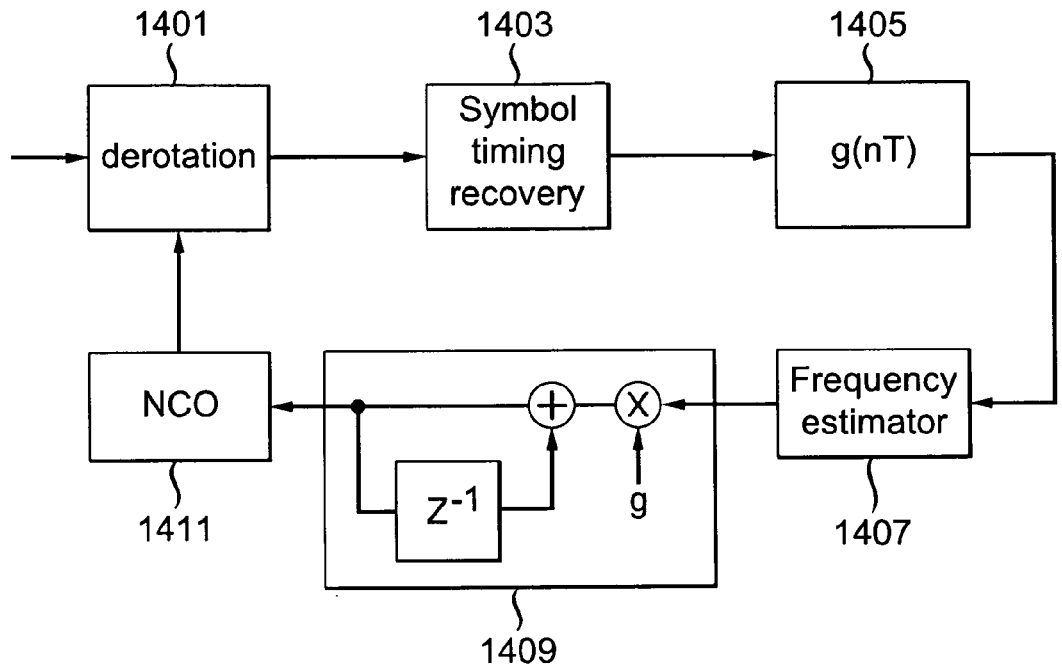
FIG. 14 shows a feedback frequency estimation hardware block diagram according to present principles.
Figure 15:
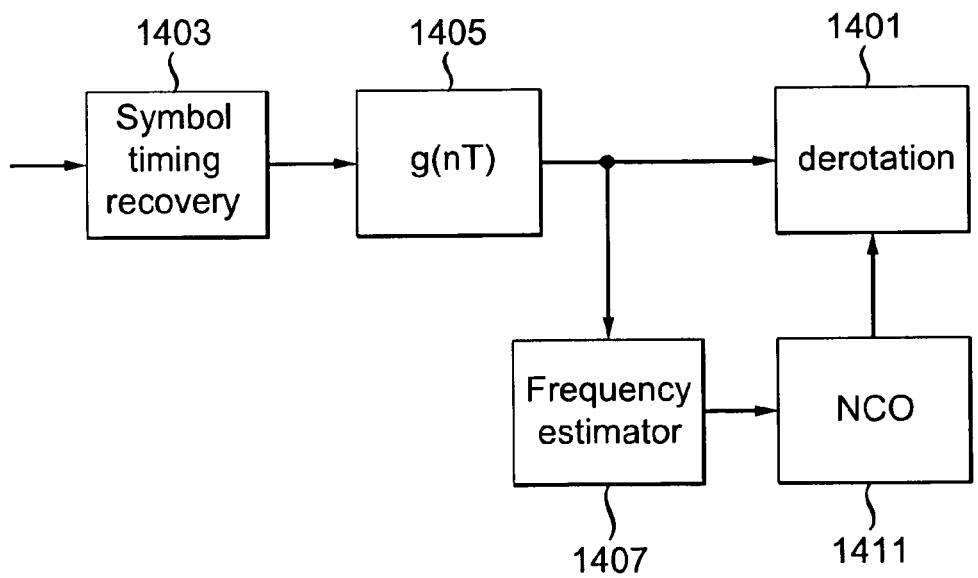
FIG. 15 shows a feedforward frequency estimation hardware block diagram according to present principles.

FIGS. 14 and 15 show systems for performing carrier recovery. The feedback approach provides the best performance in high SNR situations, but the feedforward approach is often better in high noise situations, such as in satellites. Fine tracking is often done by feedback, coarse estimation is often done by feedforward approaches.

Both the DA and NDA-ML algorithms for frequency estimation correction described above may be implemented in feedback and feedforward approaches. FIG. 14 shows a frequency estimator in a frequency recovery feedback loop. Derotation block 1401 uses a complex multiplier to derotate received sync symbols and data symbols. Symbol timing recovery (STR) block 1403 uses a variety of algorithms to enable timing recovery of the symbols. The STR block resamples the signal so that samples align with the symbols. g(nT) block 1405 represents a channel matched filter. Frequency estimator block 1407 implements either the DA or NDA-ML frequency estimation as described above to the output of g(nT) block 1405. Loop filter 1409 follows frequency estimator block 1407. The loop filter integrates and smooths the frequency estimations from 1407. The loop filter design insures stability of the phase locked loop system. A numerically controlled oscilattor (NCO) block 1411 serves to close the loop by feeding the output back to derotation block 1401.

FIG. 15 illustrates a frequency estimator in a feedforward loop. Similar elements to those shown and described with respect to FIG. 14 are identified by similar reference numerals. Symbol timing recovery block 1403 enables timing recovery of the symbols by resampling a received signal so that the samples align with the symbols. g(nT) block 1405 represents a channel matched filter. g(nT) block 1405 provides a filtered signal to frequency estimator 1407 and derotation block 1401. NCO 1411 is connected between frequency estimator 1407 and derotation block 1401. The frequency estimator 1407 drives the NCO 1411 to derotate the signal in block 1401 in a similar fashion to the approach discussed with respect to the system of FIG. 14. The frequency estimator may implement either the DA or NDA-ML frequency estimation described above. The feedforward approach relies on the frequency estimator to accurately measure the frequency offset and to directly correct the frequency offset based on the estimator output. By comparison, the closed loop approach drives the frequency error toward zero, compensating for small gain errors in the frequency estimator. Feedforward approaches are typically followed by a feedback system for fine error tracking—to drive the frequency error to zero.

The present description illustrates the present principles. It will thus be appreciated that those skilled in the art will be able to devise various arrangements that, although not explicitly described or shown herein, embody the present principles and are included within its spirit and scope.

All examples and conditional language recited herein are intended for pedagogical purposes to aid the reader in understanding the present principles and the concepts contributed by the inventor(s) to furthering the art, and are to be construed as being without limitation to such specifically recited examples and conditions.

Moreover, all statements herein reciting principles, aspects, and embodiments of the present principles, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the present principles. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The present principles as defined by such claims reside in the fact that the functionalities provided by the various recited means are combined and brought together in the manner which the claims call for. It is thus regarded that any means that can provide those functionalities are equivalent to those shown herein.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

The invention claimed is:

1. A method of frame sync detection, comprising:
   calculating a first and second differential correlation of a data signal, at a plurality of delay and conjugate multipliers;
   convolving the first and second differential correlations with respective time reversed reference sets of first and second differential correlations at a sign correlator;
   calculating a correlation peak, at a sync detector, using the convolved differential correlations, to detect a frame sync;
   storing said calculated first and second differentials in buffers;
   masking out data from the buffered differentials correlations, at a MASK block, during a blind mode;
   summing the products of the convolved differentials correlations, at an adder stage;
   generating the absolute value of the convolved differentials correlations, at an absolute value block; and
   computing a magnitude of the convolved differentials correlations to determine the correlation peak, at a magnitude block.

2. The method of claim 1, wherein the first differential correlation is a 1 T differential correlation, which uses a one-symbol delay, and the second differential correlation is a 2 T differential correlation, which uses a two-symbol delay.

3. The method of claim 1, further comprising:
   calculating an adaptive threshold, at a slew rate limiter.

4. The method of claim 3, wherein calculating the correlation peak uses the convolved differential correlations and the adaptive threshold.

5. An apparatus for frame sync detection, comprising:
   delay and conjugate multipliers, that calculate a first differential correlation and a second differential correlation of a data stream;
   at least one buffer to store the calculated first and second differential correlations; a MASK block, that masks out data from the differential correlation buffers during a blind mode;
   a sign correlator, that convolves the first and second differential correlations with respective time reversed reference sets of first and second differential correlations, wherein the reference sets are embedded in the sign of sign correlator multipliers;
   a sync detector, that calculates a correlation peak using the convolved differential correlations, to detect a frame sync;
   an adder stage, that sums the products of the convolved differential correlations;
   an absolute value block, that generates the absolute value of the convolved differential correlations; and
   a magnitude block, that computes a magnitudes of correlation of the convolved differential correlations.

6. The apparatus of claim 5, wherein the first differential correlation is a 1 T differential correlation, which uses a one-symbol delay, and the second differential correlation is a 2 T differential correlation, which uses a two-symbol delay.

7. The apparatus of claim 5, wherein the delay and conjugate multipliers include a plurality of delay and conjugate multipliers.

8. The apparatus of claim 5, further comprising:
   a slew rate limiter, that calculates an adaptive threshold.

9. The apparatus of claim 8, wherein the slew rate limiter calculates the correlation peak using the convolved differential correlations and the adaptive threshold.

* * * * *